United States Patent [19]

Lee

[11] Patent Number: 5,687,041
[45] Date of Patent: Nov. 11, 1997

[54] CASSETTE LID OPENING APPARATUS FOR TOP-LOADING CAMCORDER

[75] Inventor: Sang Jig Lee, Ansung-gun, Rep. of Korea

[73] Assignee: LG Electronics Inc., Seoul, Rep. of Korea

[21] Appl. No.: 672,570

[22] Filed: Jun. 28, 1996

[30] Foreign Application Priority Data

Jun. 28, 1995 [KR] Rep. of Korea ............... 14989

[51] Int. Cl.$^6$ ..................................... G11B 15/60
[52] U.S. Cl. ........................... 360/966; 360/96.5
[58] Field of Search ..................... 360/96.5, 96.6, 360/85

[56] References Cited

U.S. PATENT DOCUMENTS

| | | | |
|---|---|---|---|
| 4,794,478 | 12/1988 | Kamezawa et al. | 360/96.6 |
| 4,811,138 | 3/1989 | Park | 360/96.5 |
| 5,450,259 | 9/1995 | Cho et al. | 360/96.6 |
| 5,481,419 | 1/1996 | Fujishiro | 360/96.5 |
| 5,497,278 | 3/1996 | Nagatsuka et al. | 360/85 |
| 5,497,279 | 3/1996 | Nishijima et al. | 360/96.5 |

*Primary Examiner*—John H. Wolff
*Attorney, Agent, or Firm*—Birch, Stewart, Kolasch & Birch, LLP

[57] ABSTRACT

A cassette lid opening apparatus for a top-loading camcorder is disclosed including: first and second links foldably installed on both sides of a bracket; a cassette holder supported by the first and second links for receiving and mounting a cassette the magnetic tape of which is loadable when the first and second links are folded; and an opener given to the first link and for providing a upward opening force to a cassette lid of the cassette as the first and second links are folded, when a force is given to the cassette holder in order to mount the cassette received.

7 Claims, 2 Drawing Sheets

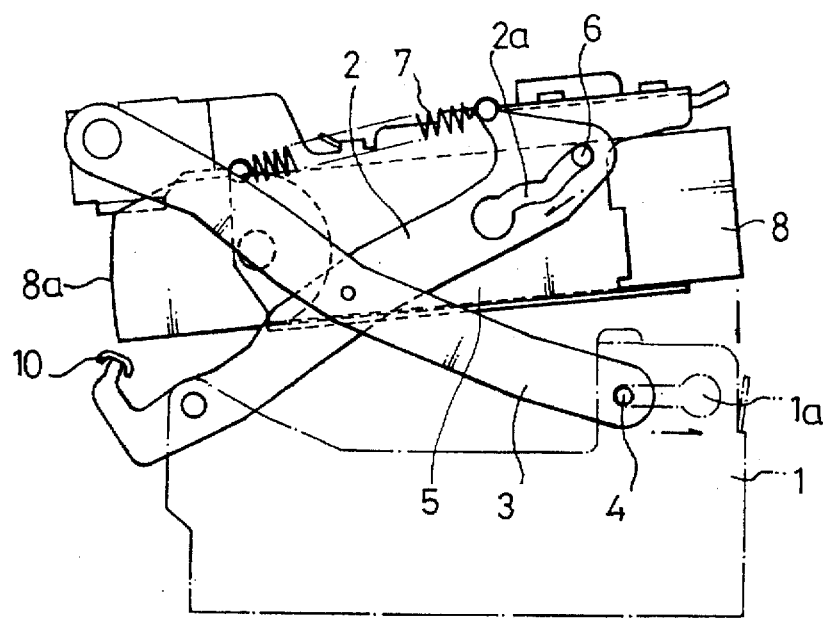
FIG.3b
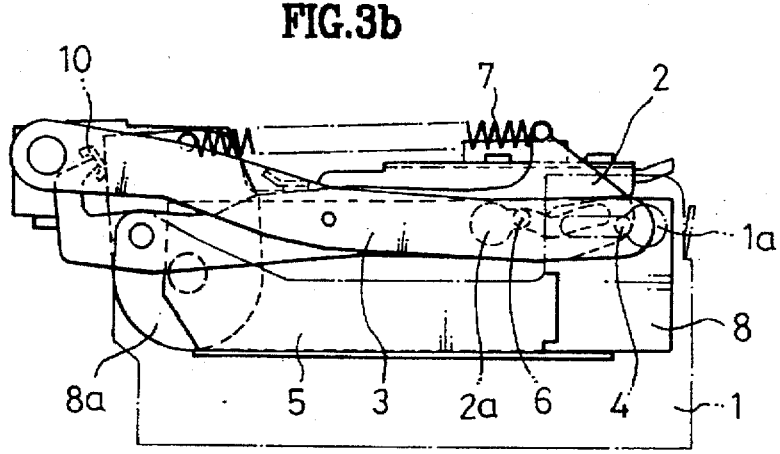
FIG.4
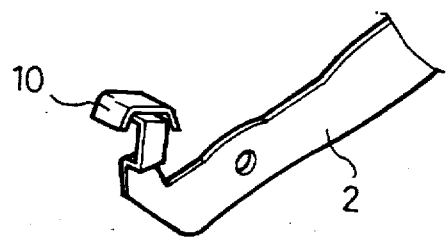

5,687,041

CASSETTE LID OPENING APPARATUS FOR TOP-LOADING CAMCORDER

BACKGROUND OF THE INVENTION

The present invention relates to a top-loading camcorder, and more particularly, to a cassette lid opening apparatus for opening a cassette lid protecting magnetic tape placed inside the cassette, when the cassette is inserted in a cassette holder and then it is compressed.

Generally speaking, a top-loading camcorder is a mode applied mainly to 8 mm camcorders, in which external video and sound signals obtained through photographing are recorded on magnetic tape by a magnetic head or the recorded signals are read out from the magnetic tape by the magnetic head.

Such top-loading camcorder is made in such a manner that a bracket 1 having a long bracket hole 1a is fixed on both front sides in the system body, and a first link 2 having a first long link hole 2a is rotatably hinged on both rear sides of the bracket. A second link 3 is rotatably hinged on the first link. A link pin 4 is fixed on one end of the second link to be guided by long bracket hole 1a formed in bracket 1, and a cassette holder 5 is rotatably hinged on the other end of the second link. A holder pin 6 is fixed to the cassette holder to be guided by first long link hole 2a formed in first link 2. To the first link 2, one end of spring 7 is connected, and to the second link 3, the other end of spring 7 is connected.

When a user selects the eject button, cassette holder 5 receives a locking release from a deck driving source (not shown), and first and second links 2 and 3 are unfolded by the restoring force of spring 7 as shown in FIG. 1A. Accordingly, cassette holder 5 comes out of bracket 1, and is positioned as shown in FIG. 1A.

In this state, when the user inserts cassette 8 into cassette holder 5 and then compresses it, the cassette holder 5 having cassette 8 receives a downward moving force. Here, first link 2 is rotated clockwise centering on the hinge shaft coupled to bracket 1, and at the same time, second link 3 receives a clockwise rotation force of the first link 2 and rotates counterclockwise centering on the hinge shaft coupled to first link 2. Therefore, link pin 4 fixed to second link 3 is guided to long bracket hole 1a formed in bracket 1, and holder pin 6 fixed to cassette holder 5 is guided to first long link hole 2a formed in first link 2. This makes cassette holder 8 move downward.

When cassette holder 5 moves downward, first and second links 2 and 3 are folded as shown in FIG. 1B by receiving the resilience of spring 7 so that cassette holder 5 is inserted into bracket 1, and cassette 8 inserted into cassette holder 5 is mounted to enable magnetic tape to be loaded inside bracket 1 while placed as shown in FIG. 1B. Here, cassette lid 8a hinged on cassette 8 and protecting the magnetic tape is opened by the cassette lid opening apparatus so that the loader (not shown) draws out the tape of cassette 8 to enable the magnetic tape to be loaded and come into close contact with the head drum.

The conventional cassette lid opening apparatus for a top-loading camcorder described above is shown in FIGS. 1A, 1B and 2. In this structure, a separately formed opener 9 is coupled to one rear side of bracket 1 so that cassette lid 8a hinged on cassette 8 is opened by coming into contact with opener 9 when cassette 8 is inserted into cassette holder 5 and it is compressed.

When cassette 8 is inserted into cassette holder 5 and it is pressed in order to load the cassette inside bracket 1, first and second links 2 and 3 are folded as stated before, and cassette holder 5 moves downward to enter bracket 1. While cassette holder 5 moves downward, opener 9 attached to the rear portion of bracket 1 does not move but cassette lid 8a protecting the magnetic tape rotates clockwise and starts to open centering on the hinge shaft upon making contact with opener 9. When cassette 8 is completely mounted inside bracket 1, cassette lid 8a is fully opened as shown in FIG. 1B.

Such conventional cassette lid opening apparatus involves the following problems because the opener is installed inside the bracket.

First, the mounting of the cassette is not performed smoothly because the cassette lid is opened only by the cassette movement force in accordance with the movement of the cassette holder.

Secondly, the distance from the rotation point of the cassette lid to the opener contact point of the cassette lid is short to increase the force to open the cassette lid. In this situation, the compression force of the cassette holder for mounting the cassette must be increased so that the cassette is drawn out of the cassette holder prior to its mounting. This often causes the mounting of the cassette to become impossible.

Thirdly, in order to prevent the cassette from being pushed, an additional push preventing member must be installed or the resilience of the elastic member supporting the cassette be increased, requiring a large force when the cassette is accepted into the cassette holder.

SUMMARY OF THE INVENTION

Therefore, it is an object of the present invention to provide a cassette lid opening apparatus for a camcorder in which an opener is equipped in a first link so that the cassette lid is opened by the downward movement force of the cassette and the upward movement force of the opener in accordance with the downward movement force of the cassette holder, when the cassette holder having the cassette is compressed to mount the cassette and thereby enable magnetic tape to be loaded.

To accomplish the object of the present invention, there is provided a cassette lid opening apparatus for a top-loading camcorder, comprising: first and second links foldably installed on both sides of a bracket; a cassette holder supported by the first and second links for receiving and mounting a cassette the magnetic tape of which is loadable when the first and second links are folded; and an opener given to the first link and for providing a upward opening force to a cassette lid of the cassette as the first and second links are folded, when a force is given to the cassette holder in order to mount the cassette received.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE ATTACHED DRAWINGS

The present invention will become more fully understood from the detailed description given hereinbelow and the accompanying drawing which are given by way of illustration only, and thus are not limitative of the present invention, and wherein FIG. 1A is a side view of important components of a conventional top-loading camcorder, in which the cassette lid is closed when the cassette is not mounted;

FIG. 3A is a side view of important components of a top-loading camcorder of the present invention, in which the cassette lid is closed when the cassette is not mounted;

FIG. 3B is a side view of important components of a top-loading camcorder of the present invention, in which the cassette lid is opened when the cassette is mounted; and FIG. 4 is a perspective view of important components of a cassette lid opening apparatus of the present invention.

DETAILED DESCRIPTION OF PREFERRED EMBODIMENT

Figure 1A:
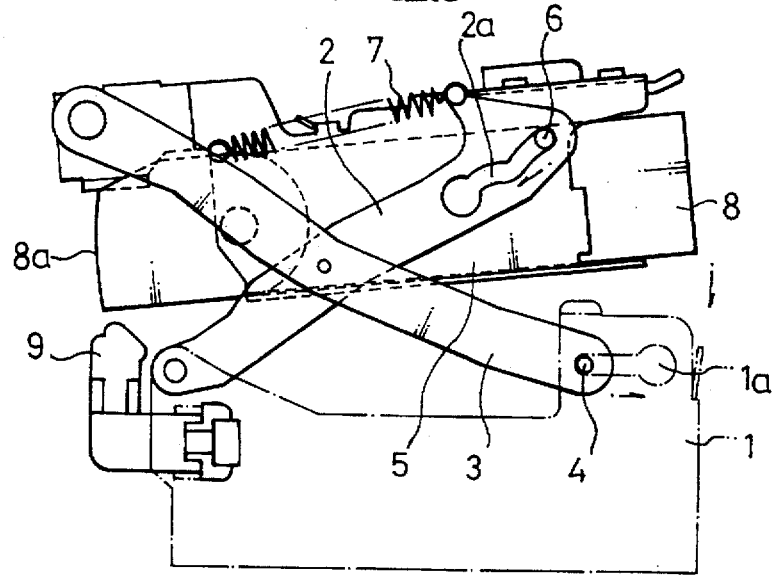
FIG. 1B is a side view of important components of a conventional top-loading camcorder, in which the cassette lid is opened when the cassette is mounted.
Figure 1B:
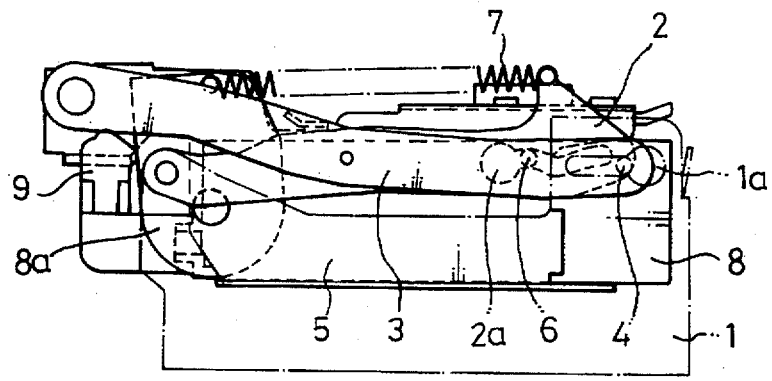
Figure 2:
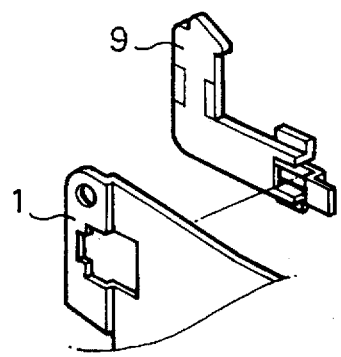
FIG. 2 is a perspective view of important components of a conventional cassette lid opening apparatus.

Hereinafter, a preferred embodiment of the present invention will be described with reference to FIGS. 3A, 3B and 4.

The first embodiment of the present invention is constructed in such a manner that an opener 10 is given to the end of one of first links 2 hinged on bracket 1, and thus cassette lid 8a of cassette 8 is opened while in contact with opener 10, when cassette 8 is inserted into cassette holder 5 and it is compressed downward.

In this structure, opener 10 is formed integrally with first link 2, as shown in FIG. 4. However, the present invention needs not to be confined to this embodiment. In another embodiment, the opener may be formed independent of the first link and then coupled thereto. Other constructions of the present invention not described herein are the same as those of the prior art.

In this cassette lid opening apparatus of a top-loading camcorder of the present invention, when cassette holder 5 is compressed downward in order to mount the cassette inside bracket 1 so that magnetic tape is loadable after cassette 8 is inserted into cassette holder 5, first and second links 2 and 3 are folded in the same operation as describe above in the prior art. By doing so, cassette holder 5 having cassette 8 therein enters bracket 1. Here, the first link 2 is rotated clockwise centering on the hinged point coupled to bracket 1 when the first and second links 2 ahd 3 are folded. As a result, opener 10 integrally formed with one of the first links 2 or separately formed therewith moves upward so that cassette lid 8a hinged on cassette 8 and protecting magnetic tape starts to open by simultaneously receiving the downward movement force of cassette 8 and the upward movement force of opener 10 from the moment at which the cassette lid makes contact with opener 10. When cassette 8 is completely mounted inside bracket 1, cassette lid 8a is fully opened as shown in FIG. 3B. Other operations of the present invention not described above would be understood with reference to those of the prior art.

As described above, in the cassette lid opening apparatus of the present invention, the cassette lid of the cassette is opened by the downward movement force of the cassette and the upward movement force of the opener in accordance with the folding of the first and second links when the cassette is inserted into the cassette holder and the cassette lid is compressed downward. By doing so, the contact point of the opener and cassette lid is placed farther from the hinged point of the cassette lid so that the force to open the cassette lid is reduced and the insertion of the cassette and the opening of the cassette lid are facilitated. This prevents the cassette from being externally drawn out prior to its complete mounting, guaranteeing the reliability of the operation.

Although the present invention has been described above with reference to the preferred embodiments thereof, those skilled in the art will readily appreciate that various modifications and substitutions can be made thereto without departing from the spirit and scope of the invention as set forth in the appended claims.

What is claimed is:

1. A cassette lid opening apparatus for a top-loading camcorder, comprising:

first and second links foldably installed on both sides of a bracket;

a cassette holder supported by said first and second links for receiving and mounting a cassette, a magnetic tape of said cassette being loadable when said first and second links are folded; and an opener located on said first link and for providing an upward opening force to a cassette lid of said cassette as said first and second links are folded.

2. A cassette lid opening apparatus for a top-loading camcorder as claimed in claim 1, wherein said opener is formed integrally to said first link.

3. A cassette lid opening apparatus for a top-loading camcorder as claimed in claim 1, wherein said opener is formed independent of said first link but coupled thereto.

4. A cassette lid opening apparatus for a top-loading camcorder, comprising:

a bracket fixed to a body of said camcorder;

a cassette holder into which a cassette tape is inserted, said holder vertically moving between a first position where said holder is outside said bracket and a second position where said holder is placed inside said bracket;

a plurality of links; at least one link of said plurality of links has one end which is rotatably fixed to said bracket and another end which is slidably installed to said cassette holder; and an opener located on one end of said at least one link of said plurality of links to rotate integrally with said at least one link, whereby said cassette lid is opened as said opener makes contact with said cassette lid, when said cassette holder having said cassette tape moves from said first position to said second position.

5. A cassette lid opening apparatus for a top-loading camcorder as claimed in claim 4, wherein said opener is integrally formed with said first link.

6. A cassette lid opening apparatus for a top-loading camcorder as claimed in claim 4, wherein said opener is formed independent of said first link but coupled thereto.

7. A cassette lid opening apparatus for a top-loading camcorder as claimed in claim 4, wherein at least one link of said plurality of links has one end of which is slidably fixed to said bracket and another end which is rotatably installed to said cassette holder.

* * * * *